(12) United States Patent
Kaschka et al.

(10) Patent No.: US 11,426,909 B2
(45) Date of Patent: Aug. 30, 2022

(54) METHOD AND DEVICE FOR PRODUCING A FLUID LINE WITH CONNECTING ELEMENT

(71) Applicant: ContiTech MGW GmbH, Hann. Muenden (DE)

(72) Inventors: Simon Kaschka, Hamburg (DE); Florian Kuhlhoff, Hamburg (DE)

(73) Assignee: ContiTech MGW GmbH, Hann. Muenden (DE)

( * ) Notice: Subject to any disclaimer, the term of this patent is extended or adjusted under 35 U.S.C. 154(b) by 0 days.

(21) Appl. No.: 17/310,043

(22) PCT Filed: Dec. 5, 2019

(86) PCT No.: PCT/EP2019/083781
§ 371 (c)(1),
(2) Date: Jul. 13, 2021

(87) PCT Pub. No.: WO2020/148017
PCT Pub. Date: Jul. 23, 2020

(65) Prior Publication Data
US 2022/0040895 A1    Feb. 10, 2022

(30) Foreign Application Priority Data

Jan. 18, 2019  (DE) .................. 10 2019 200 630.2

(51) Int. Cl.
*B29C 45/14*    (2006.01)
*F16L 47/24*    (2006.01)
*B29K 77/00*    (2006.01)
*B29K 705/02*   (2006.01)
*B29L 31/24*    (2006.01)

(52) U.S. Cl.
CPC .. *B29C 45/14598* (2013.01); *B29C 45/14221* (2013.01); *F16L 47/24* (2013.01); *B29K 2077/00* (2013.01); *B29K 2705/02* (2013.01); *B29L 2031/24* (2013.01)

(58) Field of Classification Search
None
See application file for complete search history.

(56) References Cited

U.S. PATENT DOCUMENTS

| | | |
|---|---|---|
| 5,683,647 A | 11/1997 | Kawasaki et al. |
| 2003/0030277 A1 | 2/2003 | Morohoshi et al. |
| 2006/0066100 A1 | 3/2006 | Nakashima et al. |

FOREIGN PATENT DOCUMENTS

| | | |
|---|---|---|
| DE | 69325638 T2 | 4/2000 |
| DE | 19854707 A1 | 6/2000 |
| DE | 102014215261 A1 | 2/2015 |
| DE | 102013223148 A1 | 5/2015 |

(Continued)

OTHER PUBLICATIONS

English Translation of EP1217280A2 (Year: 2002).*

*Primary Examiner* — Timothy Kennedy
*Assistant Examiner* — Olukorede Esan
(74) *Attorney, Agent, or Firm* — Gregory Adams; David L. Cate

(57) ABSTRACT

The invention relates to a method and a device for producing a fluid line (7) with a connecting element formed on an end portion of the fluid line (7), wherein the connecting element comprises a coupling part (8) and a connector (70) which connects to the coupling part (8) toward the end of the fluid line.

12 Claims, 2 Drawing Sheets

(56) References Cited

FOREIGN PATENT DOCUMENTS

| | | |
|---|---|---|
| DE | 102014004157 A1 | 9/2015 |
| DE | 102017207950 A1 | 11/2018 |
| EP | 1217280 A2 | 6/2002 |
| EP | 3404305 A1 | 11/2018 |
| FR | 1421906 A | 12/1965 |

\* cited by examiner

METHOD AND DEVICE FOR PRODUCING A FLUID LINE WITH CONNECTING ELEMENT

The invention relates to a method and a device for producing a fluid line with a connecting element formed on an end portion of the fluid line, wherein the connecting element comprises a coupling part and a connector which connects to the coupling part toward the end of the fluid line.

Fluid lines with connecting elements of said type are known and are frequently constructed in automotive engineering on the basis of the so-called VDA couplings.

So-called VDA connectors or plugs at one end of a fluid line, which can be connected to a corresponding coupling at another end of a fluid line to be connected, constitute a portion of connecting elements of said type. Said VDA connectors are distinguished in that, proceeding from the end to be connected, firstly a connector is provided and, at a particular distance from the end to be connected and directly adjacent to the connector, a conventionally annular coupling part is provided, the latter being designed as a VDA detent ring.

For forming the connection plugs on fluid-conducting metal lines according to the VDA principle, it has hitherto been known to manufacture a corresponding coupling plug as a separate component, specifically by means of turning and milling. The rotationally symmetrical components produced in this way require a groove into which a parallel key is soldered or welded. Subsequently, the coupling plug is attached sealingly to the fluid line by means of welding or soldering processes. The leak-tightness of the joining point has to be ensured. The surface of the connection plug fitted together in this manner forms the sealing surface for the O-ring of a corresponding coupling counterpart. The sealing of the fluid line at the joining point with respect to the coupling plug is complex and, during the turning and milling, high manufacturing costs arise. Owing to the joining processes used, a corrosion protection coating and complete leak testing are moreover required. This is all highly complex and disadvantageous. Moreover, rotation prevention means cannot be provided without additional effort owing to the rotational symmetry.

DE 10 2017 207 950 A1 has moreover disclosed a fluid line connection in which there are interconnected a coupling part composed of plastic with a connection portion and a tube composed of metal for forming a VDA coupling part.

It is an object of the invention to propose a method and a device of the type mentioned in the introduction with which the effort required for producing fluid lines of said type can be reduced considerably and, as far as possible, there is no need for leak testing.

To achieve the set object, a method according to the features of patent claim 1 is proposed according to the invention.

A device according to the invention is the subject of patent claim 11.

Advantageous configurations and refinements of the invention are the subject of the dependent claims.

Within the context of the production method according to the invention, it is proposed to carry out the following production steps:

First of all, a portion of the fluid line that is assigned to the coupling part is placed into a provided injection-molding tool with a cavity for forming the coupling part in an open state thereof, wherein, on one side, the further portion of the fluid line connected to the end portion of the fluid line projects beyond the cavity and, on the opposite side, a length portion of the fluid line that is assigned to the connector projects beyond the cavity.

The injection-molding tool is normally constructed from two openable and closable tool halves, which each contain a part of the total cavity and, in the closed state, come into abutment sealingly against one another along a joining surface.

The placement of the fluid line in the above-described manner is followed by closure of the injection-molding tool and the cavity formed therein with the received portion of the fluid line and preferably cylindrical opening-out of the length portion assigned to the connector, which length portion projects beyond the cavity.

This opening-out according to the invention of the length portion may be realized for example via a corresponding mandrel which is moved axially into the end portion of the fluid line.

Subsequently, the mandrel is removed again from the end portion of the fluid line, and the opened-out length portion which stays behind is received in a bell structure, which surrounds the opened-out length portion at the outer side. Here, the outer diameter of the opened-out length portion is calibrated, that is to say shaped according to its intended final diameter, whereby the connector is formed to a finished state and at the same time its outer diameter is sealed off with respect to the cavity.

It is then possible, in a subsequent step, to inject into the cavity the intended plastic for forming the coupling part on the fluid line in an injection-molding process and to allow said plastic to harden. Owing to the sealing between the outer diameter of the connector and the bell structure, an escape of plastic from the cavity between the bell structure and the connector is prevented here.

Subsequently, the bell structure can be taken off the connector, the cavity can be opened and the fluid line, with coupling part injection-molded peripherally thereon, can be removed.

Since the fluid line is furthermore formed in one piece up to the end of the connector, leak testing of the fluid-conducting line paths is not necessary. The coupling part is formed merely by encapsulation of the outer diameter of the fluid line with plastic, and so the fluid line is not interrupted.

The sealing of the cavity in the region between the connector of the fluid line and the bell structure makes it possible to dispense with impressions of the fluid line for producing the leak-tightness, and furthermore no indentation as a consequence of the mold separation of the top and bottom parts of the injection-molding tool is visible on the sealing surface of the fluid line produced.

According to one proposal of the invention, the end portion of the fluid line is firstly opened out so as to be oversized and is subsequently calibrated according to a predetermined and, in relation to the oversize, smaller outer diameter by means of the bell structure to form the connector. Such oversized opening-out may amount for example to 0.4 to 0.5 mm in diameter. As a result of the subsequent calibration, the finished calibrated connector is subjected to stress in relation to the inner surface of the bell structure, which results in the desired sealing action with respect to escape of plastic melt from the cavity.

According to a further proposal of the invention, the inner diameter of the connector received in the bell structure is also calibrated, for which purpose use may be made for example of a calibrating mandrel which is arranged centrally within the bell structure and which, during the mounting of the bell structure and the receiving of the connector, enters the lumen of the fluid line in the region of the connector.

According to a further proposal of the invention, the connector received in the bell structure may be provided, through corresponding contouring thereof, with a bevel which narrows toward the end and which, during the connection of the fluid line to a corresponding counterpart, serves as an insertion bevel for a seal ring.

According to a further proposal of the invention, that length portion of the fluid line which is assigned to the coupling part may be provided with at least one radially outwardly projecting rib and/or material accumulation, for example through corresponding contouring of the calibrating mandrel arranged centrally within the bell structure and/or by an eccentric disk actuated for example by means of a knee lever. Such radially outwardly projecting ribs bring about, in relation to the coupling part created subsequently by injection molding in this peripheral region of the fluid line, radial prevention of rotation, and an outwardly projecting material accumulation correspondingly brings about axial prevention of displacement of the coupling part in relation to the fluid line.

Furthermore, it may be provided that a stop projection is provided for the abutment of the end portion of the fluid line with the cavity open, in order for this to at all times be able to be placed into the cavity of the open injection mold in a defined and easily automatable manner. Provision may be made such that, at the time when the cavity is closed, the stop projection is removed or retracted in order to subsequently obtain unlimited access by means of the mandrel and/or the bell structure to the end portion of the fluid line.

The fluid lines used within the context of the method according to the invention may be designed for example on the basis of an aluminum tube, as are normally used in the automobile industry. Here, the fluid line is frequently provided regionally with an outer-side plastic coating, which is possibly removed in the region of the connector to be formed. Preferably, the same plastic or a plastic which is compatible with the plastic of the coating is used for the formation of the coupling part, so as to achieve good adhesion between the coupling part and the coated fluid line.

Examples of the plastic used comprise temperature-resistant plastics, for example polyamides such as PA12.

It goes without saying that the method according to the invention can also be used with injection-molding tools having multiple cavities for simultaneous production of correspondingly multiple fluid lines in one working step. In this case, provision is made of a corresponding number of mandrels used for opening-out and bell structures used for calibration and sealing according to the number of cavities.

A device proposed within the context of the invention that is suitable in particular for carrying out the previously discussed method according to the invention comprises an openable and closable injection-molding tool with a cavity which defines the outer contour of the coupling part and into which that portion of the fluid line which is assigned to the coupling part can be placed, wherein, with the injection-molding tool closed, a length portion of the fluid line that is assigned to the connector projects beyond the cavity.

Provision is furthermore made of a mandrel for end-side insertion and opening-out of that length portion of the fluid line which is assigned to the connector and of a bell structure for receiving and calibrating the opened-out length portion to form the connector and for sealing off the connector with respect to the cavity.

According to one proposal of the invention, the mandrel and the bell structure are arranged on a common displaceable tool carrier, with the result that all the working steps for producing the fluid line can be carried out in a single chucking operation.

According to one exemplary embodiment of the invention, the mandrel has a larger outer diameter than the inner diameter of the bell structure, with the result that, during the calibration of the connector, a radially inwardly acting force is exerted on the connector, said force inducing corresponding stresses in the connector and being responsible for the achievement of good sealing action between the outer surface of the connector and the inner surface of the bell structure.

The bell structure may furthermore comprise a central calibrating mandrel for calibrating the inner diameter of the connector and/or for producing at least one radially outwardly projecting rib and/or material accumulation in that length portion of the fluid line which is assigned to the coupling part. In order, in this respect, to extend into that length portion of the fluid line which is assigned to the coupling part, the calibrating mandrel, in comparison with the bell structure, is formed to be correspondingly longer and to project.

Furthermore, the bell structure may be configured in such a way that, during the receiving of the connector, a bevel in the connector that narrows toward the end can be produced, said bevel being able to serve as an insertion bevel for an O-ring during later use of the fluid line.

Furthermore, the device may also have a stop projection for precise abutment of the end portion of the fluid line.

Finally, within the context of the device according to the invention, provision may also be made of a plurality of cavities, mandrels and bell structures for simultaneous production of such a plurality of fluid lines.

The invention will be discussed in more detail below on the basis of an exemplary embodiment in the drawing. In the drawings.

Figure 1:
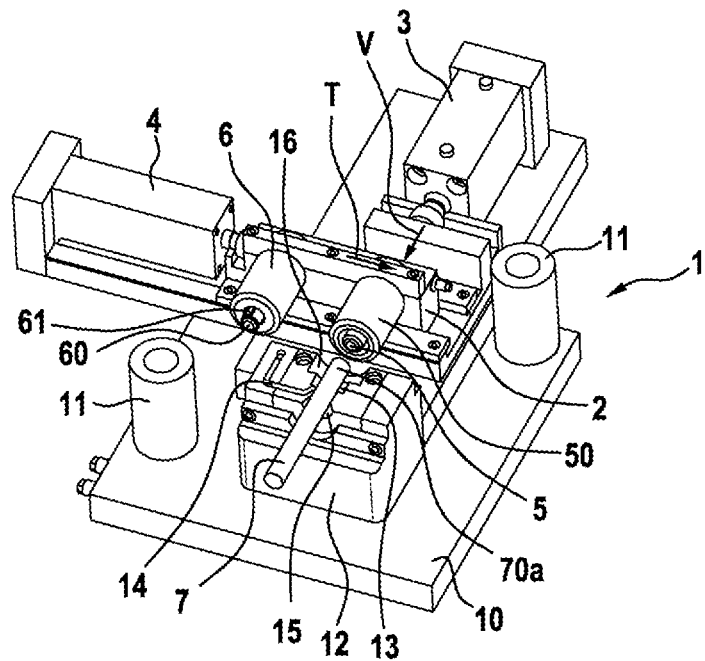
FIGS. 1 to 3 show, in several successive working steps, the bottom part of a device working by the method according to the invention in a schematic illustration.
Figure 2:
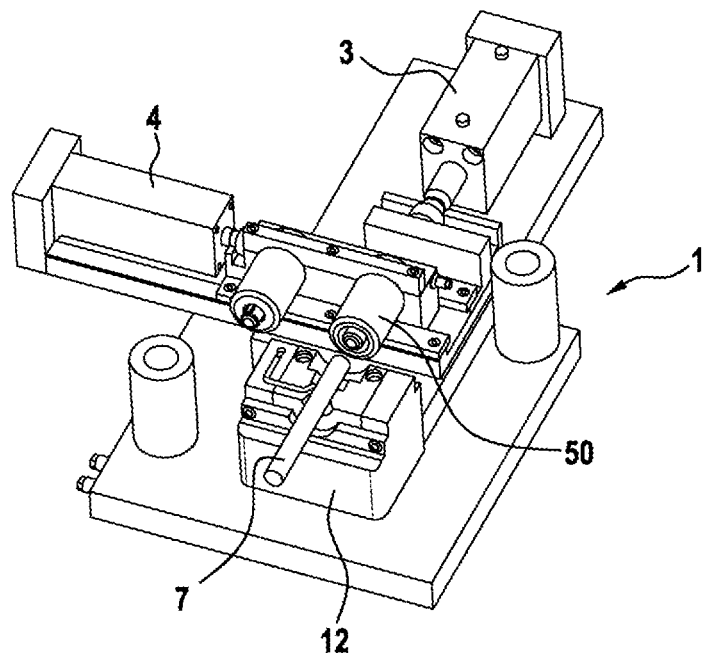
Figure 3:
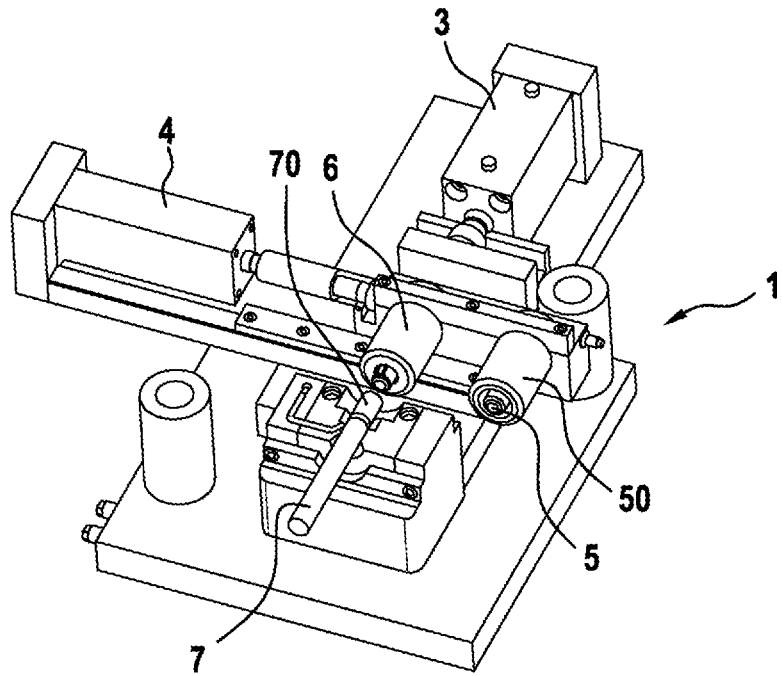

From FIGS. 1 to 3, a part, in this case the bottom part, of a device for producing a fluid line with a connecting element, in particular a VDA connector, formed on the end portion of the fluid line is illustrated in a simplified illustration.

For the sake of better clarity, all the components of the device have been provided with reference signs only in FIG. 1, and in this respect reference is also made at all times to FIG. 1 in the discussion below.

What can be seen is an injection-molding tool (denoted globally by reference sign 1) in the form of the tool bottom part, which has a base plate 10 on which there are fastened in two opposite corner regions centering bushes 11 which, upon closure of the tool top part (not illustrated here), corresponding centering pins enter.

Figure 4:
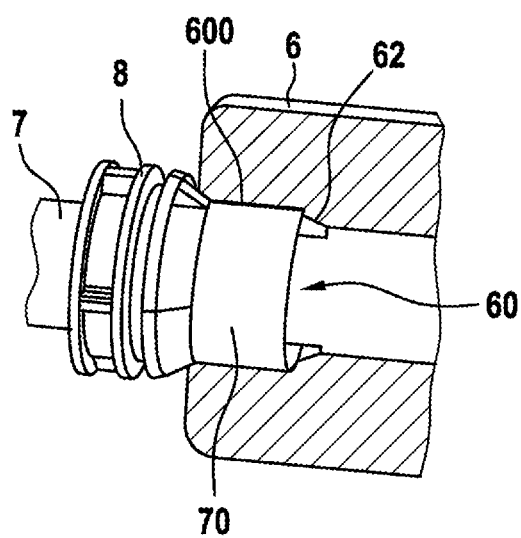
FIG. 4 shows a partial section through a bell structure of the device according to the invention.

Fastened on the base plate 10 is a mold bottom part 12 of the injection mold with the corresponding lower half of the cavity 13, which has a configuration which is suitable for the formation of the outer contour of the desired coupling part 8 (see FIG. 4).

Arranged behind the injection mold 12 in the illustration as per FIG. 1 is a tool carrier 2, which carries a mandrel 5 and also a sleeve 50 arranged concentrically around the mandrel so as to leave clear a cylindrical gap space.

Furthermore, there is also a bell structure 6 fastened on the common tool carrier 2, which bell structure corresponds to the sleeve 50 in terms of its outer dimensions and has a central calibrating mandrel 60 which projects in the direction of the injection mold or of the mold bottom part 12 illustrated here. A cylindrical gap space is also formed between the calibrating mandrel 60 and the bell structure 6.

By means of two drives 3, 4 arranged in a common plane so as to be offset from one another by 90° and, for example, in the form of pneumatic cylinders, the tool carrier 2, together with the bell structure 6 fastened thereon and the mandrel 5, can be moved due to guidance in corresponding rails 20 in and counter to the arrow direction T by means of the drive 4 and, at right angles thereto, in and counter to the arrow direction V by means of the drive 3.

For producing a fluid line with a connecting element formed on the end portion, a blank of the fluid line 7, for example an aluminum tube of constant diameter, is, with the injection-molding tool 1 open and the cavity 13 correspondingly accessible, placed into the open injection-molding tool 1 such that that portion of the fluid line 7 which is assigned to the subsequent coupling part comes to lie in the cavity 13. Accordingly, the adjoining length portion 70a, assigned to the subsequent connector, of the fluid line projects beyond the cavity 13 into a corresponding receiving region 16 of the mold bottom part 12, which receiving region is widened in a stepped manner.

Opposite this, the remaining length portion of the fluid line 7 projects over an insertion opening 15 leading into the cavity 13, opposite the receiving region 16, likewise out of the cavity 13 and can be supported by means of support means (not illustrated).

To facilitate the determination of this exact positioning within the open cavity 13 of the fluid line 7 with that portion of the fluid line 7 which is assigned to the subsequent coupling part, provision may be made of a possibly retractable stop projection against which the end portion of the fluid line 7 is made to abut during placement into the mold bottom part 12.

It goes without saying that the mold top part (not illustrated here) is arranged in a correspondingly mirror-inverted manner.

After placement of the fluid line 7 according to the illustration in FIG. 1, the injection-molding tool 1 can be closed, that is to say the corresponding mold top part (not illustrated here) is mounted onto the mold bottom part 12.

By actuation of the drive 3, the tool carrier 2 can then be displaced in the direction of the placed-in fluid line 7 as per arrow V, wherein the mandrel 5, which is oriented coaxially in relation to the fluid line 7 in this respect, enters the length portion 70a, projecting from the cavity 13, of the fluid line 7 and opens it out to an enlarged diameter, as illustrated in FIG. 2. At the same time, the sleeve 50 surrounding the mandrel enters the receiving region 16, and the opened-out length portion 70a comes to lie in the cylindrical gap space between mandrel 5 and sleeve 50.

Subsequently, the drive 3 can be moved back and the drive 4 can be actuated in the arrow direction T such that the bell structure 6 fastened on the tool carrier 2 and the calibrating mandrel 60 arranged in a centrally projecting manner are oriented so as to be coaxial in relation to the opened-out length portion 70a of the fluid line 7 (see FIG. 3).

By a renewed forward displacement of the drive 3 in the arrow direction V, the calibrating mandrel 60 enters the opened-out length portion 70a of the fluid line 7, wherein corresponding projections 61 arranged on the calibrating mandrel form radially outwardly projecting ribs in the length portion 70a of the fluid line 7. At the same time, the bell structure 6, like the sleeve 50 previously, enters the receiving region 16 and receives the opened-out length portion 70a of the fluid line 7 in the region of its inner surface, which faces the cylindrical gap space.

It is provided that the length portion 70a is opened out by the mandrel 5 so as to be oversized slightly in relation to the inner diameter of the bell structure 6, for example according to an oversize of approximately 0.4 to 0.5 mm in diameter. Thus, when entering the bell structure 6, the length portion 70a is pushed back radially to a slight extent in the region of its outer surface and is calibrated according to its finished size, wherein at the same time the inner surface is also calibrated by the calibrating mandrel 60 with production of the radially projecting ribs.

This state can be seen in FIG. 4 in a simplified illustration, wherein it can furthermore be seen that a bevel 62 is provided within the bell structure, which bevel causes the formation at the free end of the fluid line 7 of a correspondingly narrowing bevel, the latter serving at a later stage as an insertion aid for an O-ring of a counterpart of the fluid line 7.

As a result of the radially inwardly directed calibration of the surface of that end portion of the fluid line 7 which is received in the bell structure 6, the connector 70 is produced with the desired finished size, wherein there are generated radial stresses in the material of the fluid line 7 that establish good surface pressure between the connector 70 and the inner surface of the bell structure 6 in the region of the gap 600. In this way, by means of the bell structure 6, which has entered the receiving region 16, the cavity 13 is closed off in a sealing manner, with the result that it is subsequently possible for plastic material to be injected into the cavity 13 via the melt channel 14, which melt channel can be seen in FIG. 1, without there being the risk that said material can escape via the sealed-off gap 600.

Consequently, the coupling part 8 which can be seen from FIG. 4 can be produced from the plastic used, for example PA12, on the outer surface of the fluid line 7 through plastic encapsulation in the cavity 13, wherein the radially outwardly projecting ribs which were created previously by means of the calibrating mandrel 60 bring about axial prevention of rotation. A radial material accumulation which is possibly produced additionally can also bring about axial prevention of displacement.

After the injected plastic in the cavity 13 has hardened, the bell structure 6 can be retracted counter to the arrow V, the injection-molding tool 1 can be opened and the finished fluid line 7 with connecting element formed on the end portion of the fluid line 7 can be removed from the coupling part 8 and the adjoining connector 70.

Since the coupling part 8 has merely been injection molded onto the continuous fluid line 7, no subsequent leak testing is necessary. Furthermore, all the processing steps are realized in a single chucking operation and thus with a minimum number of handling steps.

If the fluid line 7 used is, for its part, provided with a plastic peripheral border, it is proposed that this is produced from a plastic which is compatible with or is preferably identical to the coupling part 8 and possibly is removed in the region of the length portion 70a assigned to the connector 70 prior to placement in the previously discussed device.

The advantages which can be achieved with the previously discussed invention lie in a significant cost reduction through omission of hitherto necessary welding and soldering processes and subsequent leak testing, in considerable cost reduction through elimination of corrosion protection treatment, and also in saving of weight and reduction of required manufacturing steps.

It goes without saying that the previously discussed device and the method are suitable for producing not only VDA connectors but also any other connecting elements at a fluid line.

LIST OF REFERENCE SIGNS

1: Injection-molding tool
2: Tool carrier
3, 4: Drive
5: Mandrel
6: Bell structure
7: Fluid line
8: Coupling part
10: Base plate
11: Centering bushes
12: Mold bottom part
13: Cavity
14: Melt channel
15: Insertion opening
16: Receiving region
20: Rail
50: Sleeve
60: Calibrating mandrel
61: Projections
62: Bevel
70: Connector
70a: Length portion
600: Sealing surface
V, T: Directional arrows

The invention claimed is:

1. A method for producing a fluid line with a connecting element formed on an end portion of the fluid line, wherein the connecting element comprises a coupling part and a connector which connects to the coupling part toward the end of the fluid line, the method comprising:
placing that portion of the fluid line which is assigned to the coupling part into an open cavity of an injection-molding tool which forms the coupling part, wherein a length portion of the fluid line that is assigned to the connector projects beyond the cavity;
closing the cavity and opening out the length portion projecting beyond the cavity;
receiving the opened-out length portion in a bell structure, wherein the outer diameter is calibrated in a manner sealing off with respect to the cavity, with formation of the connector;
injecting plastic into the cavity, with formation of the coupling part on the fluid line;
opening the cavity and removing the fluid line.

2. The method as claimed in claim 1, wherein the length portion is firstly opened out so as to be oversized and is subsequently calibrated according to a predetermined smaller outer diameter by means of the bell structure to form the connector.

3. The method as claimed in claim 1, wherein the inner diameter of the connector received in the bell structure is also calibrated.

4. The method as claimed in claim 1, wherein the connector received in the bell structure is provided with a bevel which narrows toward the end.

5. The method as claimed in claim 1, wherein the length portion of the fluid line which is assigned to the coupling part is provided with at least one radially outwardly projecting rib and/or material accumulation.

6. The method as claimed in claim 1, wherein a stop projection is provided for abutment of the end portion of the fluid line with the cavity open.

7. The method as claimed in claim 1, wherein use is made of a fluid line based on an aluminum tube.

8. The method as claimed in claim 1, wherein the fluid line is provided regionally with an outer-side plastic coating, and the same plastic or a plastic which is compatible with the plastic of the coating is used for the formation of the coupling part.

9. The method as claimed in claim 8, wherein a polyamide is used as a plastic.

10. The method as claimed in claim 1, wherein the injection-molding tool comprises multiple cavities for simultaneous production of correspondingly multiple fluid lines.

11. The method of claim 1, further comprising forming radially outwardly projecting ribs in the length portion of the fluid line by a calibrating mandrel.

12. The method of claim 11, further comprising receiving the opened out length portion of the fluid line in a region of an inner surface of a bell structure at the same time as forming the radially outwardly projecting ribs.

* * * * *